US012652670B2

(12) United States Patent
Zhang et al.

(10) Patent No.: US 12,652,670 B2
(45) Date of Patent: Jun. 9, 2026

(54) METHODS, DEVICES, AND SYSTEMS FOR UCI MULTIPLEXING WITH PUSCH

(71) Applicant: ZTE Corporation, Shenzhen (CN)

(72) Inventors: Junfeng Zhang, Shenzhen (CN); Wei Gou, Shenzhen (CN); Xianghui Han, Shenzhen (CN); Shuaihua Kou, Shenzhen (CN); Xingguang Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 308 days.

(21) Appl. No.: 18/508,442

(22) Filed: Nov. 14, 2023

(65) Prior Publication Data

US 2024/0089973 A1     Mar. 14, 2024

Related U.S. Application Data

(63) Continuation of application No. PCT/CN2022/087534, filed on Apr. 19, 2022.

(51) Int. Cl.
*H04W 4/00* (2018.01)
*H04W 72/21* (2023.01)
(Continued)

(52) U.S. Cl.
CPC ......... *H04W 72/21* (2023.01); *H04W 72/566* (2023.01); *H04L 1/1854* (2013.01); *H04L 5/0044* (2013.01)

(58) Field of Classification Search
None
See application file for complete search history.

(56) References Cited

U.S. PATENT DOCUMENTS

2021/0007129 A1 *     1/2021     Talarico ............ H04W 72/1268
2021/0092763 A1     3/2021     Yingzhe et al.
(Continued)

FOREIGN PATENT DOCUMENTS

CN     113572495 A     10/2021
EP     3734999 A1     11/2020
(Continued)

OTHER PUBLICATIONS

European Patent Office Office Action regarding Application No. 22 937 743.7 dated Sep. 1, 2025, 8 pages.
(Continued)

*Primary Examiner* — Bob A Phunkulh
(74) *Attorney, Agent, or Firm* — Crowell & Moring LLP

(57)     ABSTRACT

The present disclosure describes methods, system, and devices for uplink control information (UCI) multiplexing with a physical uplink shared channel (PUSCH). One method includes in response to a physical uplink control channel (PUCCH) with a set of UCIs overlapping with a PUSCH with a configured grant UCI (CG-UCI), multiplexing, by a user equipment (UE), the set of UCIs in the PUCCH with the CG-UCI in the PUSCH by: in response to a UCI in the set of UCIs having a same physical priority as the CG-UCI: combining the UCI and the CG-UCI to obtain a new UCI, assigning, the new UCI with a type being same as that of the UCI, and multiplexing the new UCI on the PUSCH according to a pre-defined multiplexing rule.

16 Claims, 11 Drawing Sheets

400 in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by: in response to a UCI in the set of UCIs having a same physical priority as the CG-UCI: combining the UCI and the CG-UCI to obtain a new UCI, assigning, the new UCI with a type being same as that of the UCI, and multiplexing the new UCI on the PUSCH according to a pre-defined multiplexing rule

410

(51) Int. Cl.
    *H04W 72/566*     (2023.01)
    *H04L 1/1829*     (2023.01)
    *H04L 5/00*     (2006.01)

(56)             References Cited

U.S. PATENT DOCUMENTS

| | | | |
|---|---|---|---|
| 2021/0100024 A1 | 4/2021 | Jonghyun et al. | |
| 2022/0174721 A1* | 6/2022 | Oviedo | H04L 5/0053 |
| 2022/0174722 A1* | 6/2022 | Talarico | H04W 74/002 |
| 2022/0225360 A1* | 7/2022 | Yi | H04W 72/21 |
| 2022/0256575 A1* | 8/2022 | Wang | H04W 72/21 |
| 2023/0389010 A1* | 11/2023 | Guo | H04W 72/56 |
| 2023/0422242 A1* | 12/2023 | Guo | H04W 72/56 |
| 2024/0380558 A1* | 11/2024 | Fu | H04L 1/1671 |

FOREIGN PATENT DOCUMENTS

| | | | |
|---|---|---|---|
| WO | WO 2019/130522 A1 | 7/2019 | |
| WO | WO 2020/226549 A1 | 11/2020 | |
| WO | WO 2022045955 A1 | 3/2022 | |
| WO | WO 2022061716 A1 | 3/2022 | |

OTHER PUBLICATIONS

Japanese-language Notice of Allowance with machine translation regarding Application No. 2023-572144 dated Feb. 4, 2025 (5 pages).

International Search Report and Written Opinion regarding PCT/CN2022/087534 dated Nov. 25, 2022.

Intel Corporation, "Further details of intra-UE uplink channel multiplexing and prioritization," 3GPP TSG RAN WGI #106bis-e, R1-2109607, Oct. 19, 2021.

Japanese Office Action and English translation of the Office Action regarding 2023-572144 dated Nov. 15, 2024, 8 pages.

Extended European Search Report regarding EP 22 93 7743 dated Jun. 10, 2024, 9 pages.

Korean-language Office Action with English summary of Office Action issued in Korean Application No. 10-2023-7040140 dated Nov. 26, 2025, (9 pages).

* cited by examiner

100

400 in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by: in response to a UCI in the set of UCIs having a same physical priority as the CG-UCI: combining the UCI and the CG-UCI to obtain a new UCI, assigning, the new UCI with a type being same as that of the UCI, and multiplexing the new UCI on the PUSCH according to a pre-defined multiplexing rule

450 in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by: assigning, the CG-UCI with a physical priority being same as that of the PUSCH; multiplexing the set of UCIs and the CG-UCI on the PUSCH according to a pre-defined multiplexing rule

| HARQ-ACK bits | CG-UCI bits |
|---|---|

| CG-UCI bits | HARQ-ACK bits |
|---|---|

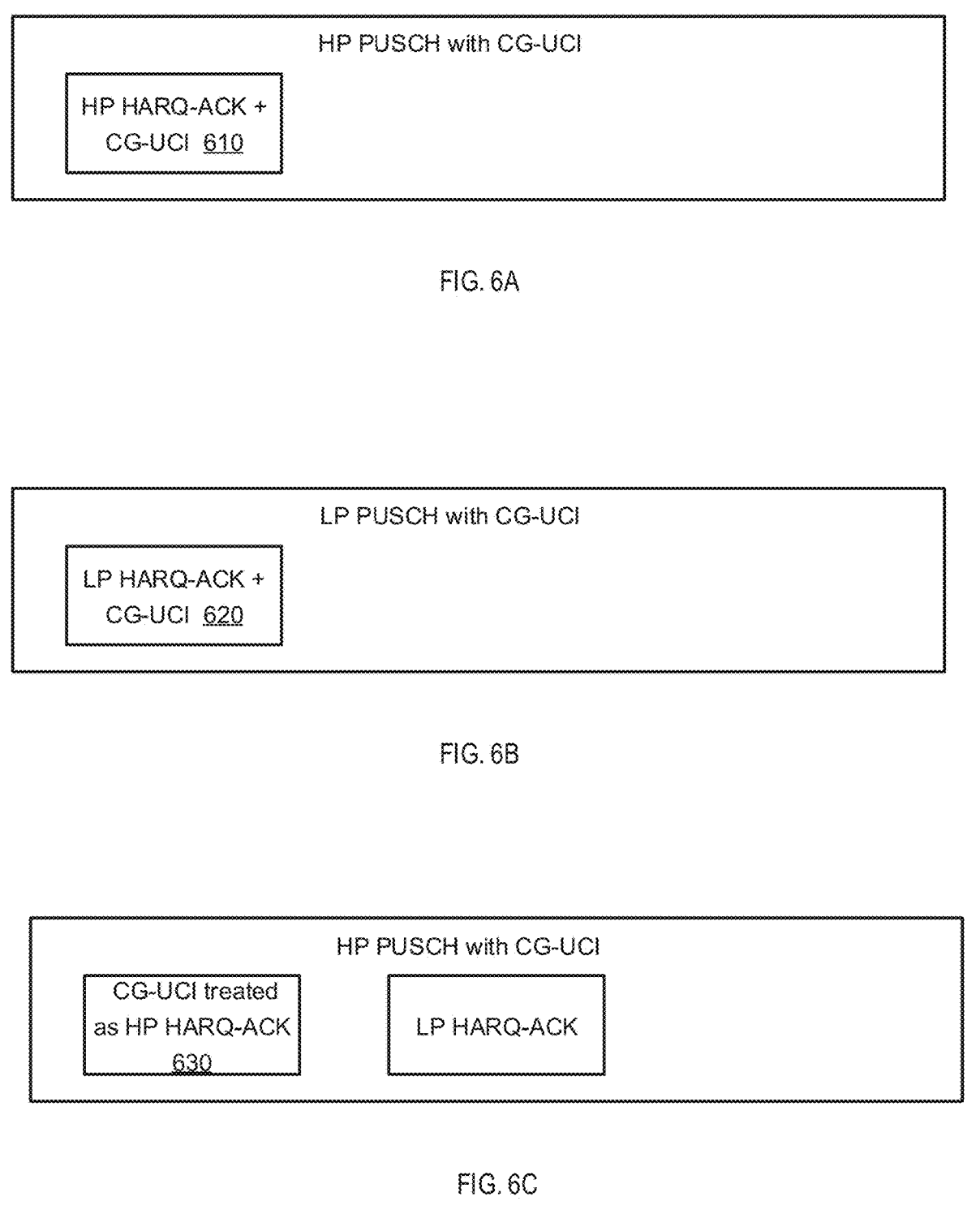

HP PUSCH with CG-UCI

HP HARQ-ACK +
CG-UCI 610

FIG. 6A

LP PUSCH with CG-UCI

LP HARQ-ACK +
CG-UCI 620

FIG. 6B

HP PUSCH with CG-UCI

CG-UCI treated
as HP HARQ-ACK
630

LP HARQ-ACK

FIG. 6C

| HP HARQ-ACK | HP CSI part 1 | LP HARQ-ACK | PUSCH |
|:---:|:---:|:---:|:---:|
| 812 | 814 | 816 | |

| HP HARQ-ACK | HP CSI part 1 | PUSCH |
|:---:|:---:|:---:|
| 812 | 814 | |

| HP HARQ-ACK | HP CSI part 1 | LP HARQ-ACK | PUSCH |
|:---:|:---:|:---:|:---:|
| 812 | 814 | 816 | |

| HP HARQ-ACK | HP CSI part 1 | PUSCH |
|:---:|:---:|:---:|
| 812 | 814 | |

| HP HARQ-ACK 812 | HP CSI part 1 814 | LP HARQ-ACK 816 | PUSCH |

| HP HARQ-ACK 812 | HP CSI part 1 814 | PUSCH |

FIG. 8C

METHODS, DEVICES, AND SYSTEMS FOR UCI MULTIPLEXING WITH PUSCH

CROSS-REFERENCE TO RELATED APPLICATION

This application is a continuation application of PCT International Patent Application No. PCT/CN2022/087534, filed with the China National Intellectual Property Administration, PRC on Apr. 19, 2022, which is herein incorporated by reference in its entirety.

TECHNICAL FIELD

The present disclosure is directed generally to wireless communications. Particularly, the present disclosure relates to methods, devices, and systems for uplink control information (UCI) multiplexing with a physical uplink shared channel (PUSCH).

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

In mobile communication networks, e.g., NR (New Radio), when a physical uplink control channel (PUCCH) with an uplink control information (UCI) overlaps with a physical uplink shared channel (PUSCH), the UCI may be multiplexed with the PUSCH. A payload of information bit of control may be carried by the PUSCH. The multiplexing may occur among the same physical priority PUCCH with UCI and the PUSCH, and may also occur among the different physical priorities PUCCH with UCI and the PUSCH. There are some issues/problems about multiplexing a PUCCH with UCI with a PUSCH, some of which was under investigation and the solutions to them were not clear. For example, one of the issues/problems may include how to multiplex a PUCCH with UCI with a PUSCH carrying a configured grant UCI (CG-UCI); and/or one of the issues/problems may include how to handle the multiplexing of the UCI when there is insufficient resource elements (Res) in the PUSCH to be provided for the UCI.

The present disclosure describes various embodiments for configuring UCI multiplexing with a PUSCH, which may address at least one of issues/problems associated with the existing system, thus improving the efficiency and/or performance of the wireless communication.

SUMMARY

This document relates to methods, systems, and devices for wireless communication, and more specifically, for uplink control information (UCI) multiplexing with a physical uplink shared channel (PUSCH). The various embodiments in the present disclosure may include new ways of configuring UCI multiplexing with a PUSCH, which is beneficial to improve the joint operation of a physical uplink control channel (PUCCH) with UCI transmission and a PUSCH transmission, to increase the resource utilization efficiency, and to boost latency performance of the wireless communication, including but not limited to, ultra-reliable low latency communication (URLLC).

In one embodiment, the present disclosure describes a method for wireless communication. The method includes in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by: in response to a UCI in the set of UCIs having a same physical priority as the CG-UCI: combining the UCI and the CG-UCI to obtain a new UCI, assigning, the new UCI with a type being same as that of the UCI, and multiplexing the new UCI on the PUSCH according to a pre-defined multiplexing rule.

In one embodiment, the present disclosure describes a method for wireless communication. The method includes in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by: assigning, the CG-UCI with a physical priority being same as that of the PUSCH; multiplexing the set of UCIs and the CG-UCI on the PUSCH according to a pre-defined multiplexing rule.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 4B shows a flow diagram of another method for wireless communication.

FIG. 6A shows a schematic diagram of an exemplary embodiment for wireless communication.

FIG. 6B shows a schematic diagram of another exemplary embodiment for wireless communication.

FIG. 6C shows a schematic diagram of another exemplary embodiment for wireless communication.

FIG. 8C shows a schematic diagram of another exemplary embodiment for wireless communication.

DETAILED DESCRIPTION

Figure 1:
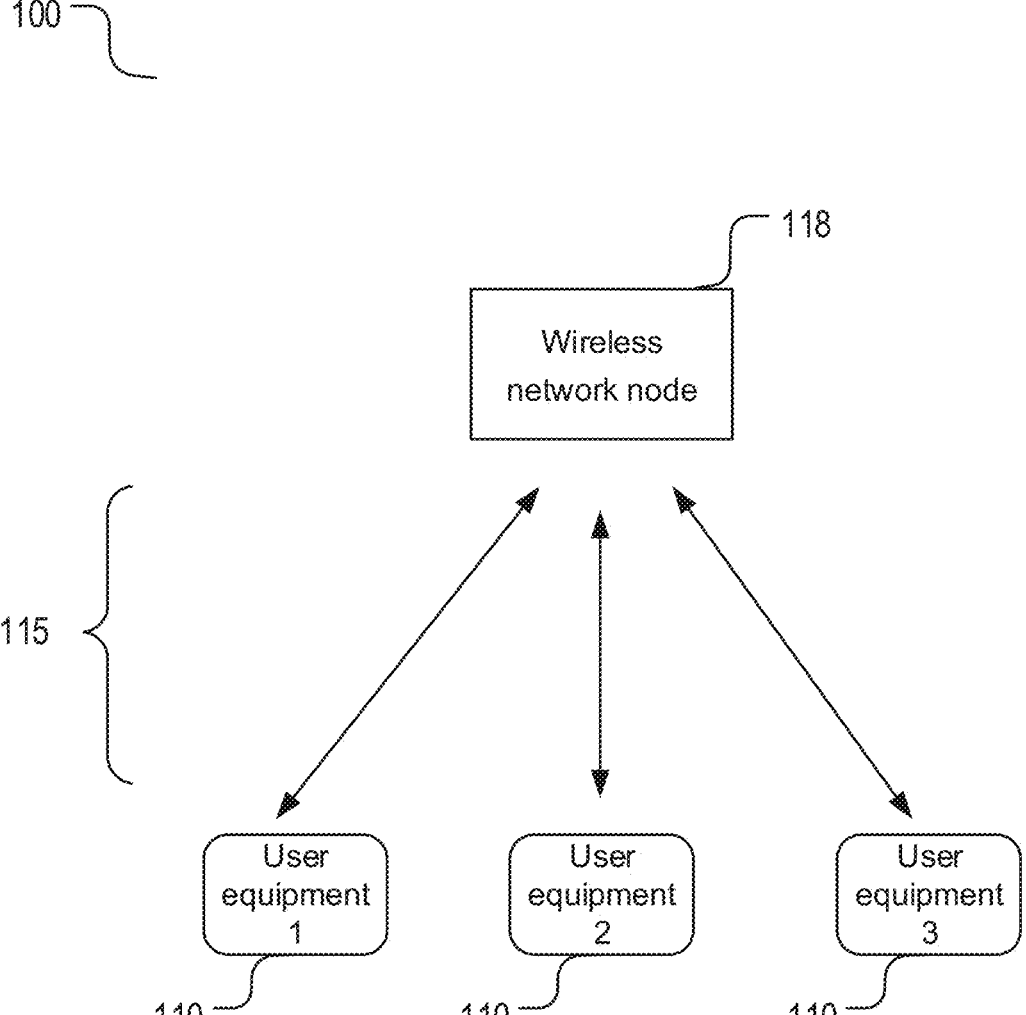
FIG. 1 shows an example of a wireless communication system include one wireless network node and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods, devices, systems, products, and/or computer-readable mediums for uplink control information (UCI) multiplexing with a physical uplink shared channel (PUSCH).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

In mobile communication networks, e.g., NR (New Radio), when a physical uplink control channel (PUCCH) with a uplink control information (UCI) overlaps with a physical uplink shared channel (PUSCH), the UCI may be multiplexed with the PUSCH. A payload of information bit of control may be carried by the PUSCH. The multiplexing may occur among the same physical priority PUCCH with UCI and the PUSCH, and may also occur among the different physical priorities PUCCH with UCI and the PUSCH. There are some issues/problems about multiplexing a PUCCH with UCI with a PUSCH, some of which was under investigation and the solutions to them were not clear. For example, one of the issues/problems may include how to multiplex a PUCCH with UCI with a PUSCH carrying a configured grant UCI (CG-UCI); and/or one of the issues/problems may include how to handle the multiplexing of the UCI when there is insufficient resource elements (Res) in the PUSCH to be provided for the UCI.

In some implementations, in NR, a basic scheme may be used to support UCI multiplexing with PUSCH when the PUCCH with UCI overlaps with the PUSCH, i.e., UCI and uplink data are simultaneously transmitted. In some implementations, a user equipment (UE) may provide at most three coding chains to contain at most three kinds of UCIs multiplexing with PUSCH with/without uplink shared channel (UL-SCH). The three coding chains may be provided one by one to contain at most three UCIs based on the descending order of priorities of UCIs. The priority of a UCI may be also referred as a UCI priority.

In some implementations, the UCI priority descending order may include: a high priority (HP) hybrid automatic repeat request (HARQ), a HP channel state information part one (CSI part 1), a HP channel state information part two (CSI part 2), a low priority (LP) HARQ, a LP CSI part 1, and a LP CSI part 2. The aforementioned CSI part 1/2 may each be a channel state information report. The HP HARQ and the LP HARQ may include a HP hybrid automatic repeat request acknowledgement (HARQ-ACK) and a LP hybrid automatic repeat request acknowledgement (HARQ-ACK), respectively.

In some implementations, when a number of types of UCIs exceeds three, which may be the largest capacity of coding chains, three types of UCIs with high UCI priorities may be selected for multiplexing with the PUSCH; and/or the leftover UCIs may be dropped and may not be multiplexed with the PUSCH.

In some implementations, some resource elements (Res) may be semi-statically or dynamically allocated to at most three parts of UCI to be multiplexed with the PUSCH. The calculation of a number of REs for the to-be-multiplexed UCIs may be based on $\beta_{offset}$ and/or $\alpha$. The $\beta_{offset}$ may be a coding rate, and/or the $\alpha$ may be a percentage of PUSCH may be used for UCI multiplexing. In some implementations, the HARQ, because of its importance, may be mapped to a first orthogonal frequency division multiplexing (OFDM) symbol after a first demodulation reference signal (DMRS); and/or other types of UCIs (e.g., CSI reports), including less important/critical bits, may be mapped to the subsequent OFDM symbols. Here and in various embodiments/implementations in the present disclosure, a "first" symbol after a signal is not merely referred to "a" symbol after the signal; but may be referred to an "earliest" symbol after the signal in a time domain, or a symbol "immediately following" the signal in the time domain.

FIG. 1 shows a wireless communication system 100 including a wireless network node 118 and one or more user equipment (UE) 110. The wireless network node may include a network base station, which may be a NodeB (NB, e.g., gNB) in a mobile telecommunications context. Each of the UE may wirelessly communicate with the wireless network node via one or more radio channels 115 for downlink/uplink communication. For example, a first UE 110 may wirelessly communicate with a wireless network node 118 via a channel including a plurality of radio channels during a certain period of time. The network base station 118 may send high layer signaling to the UE 110. The high layer signaling may include configuration information for communication between the UE and the base station. In one implementation, the high layer signaling may include a radio resource control (RRC) message.

Figure 2:
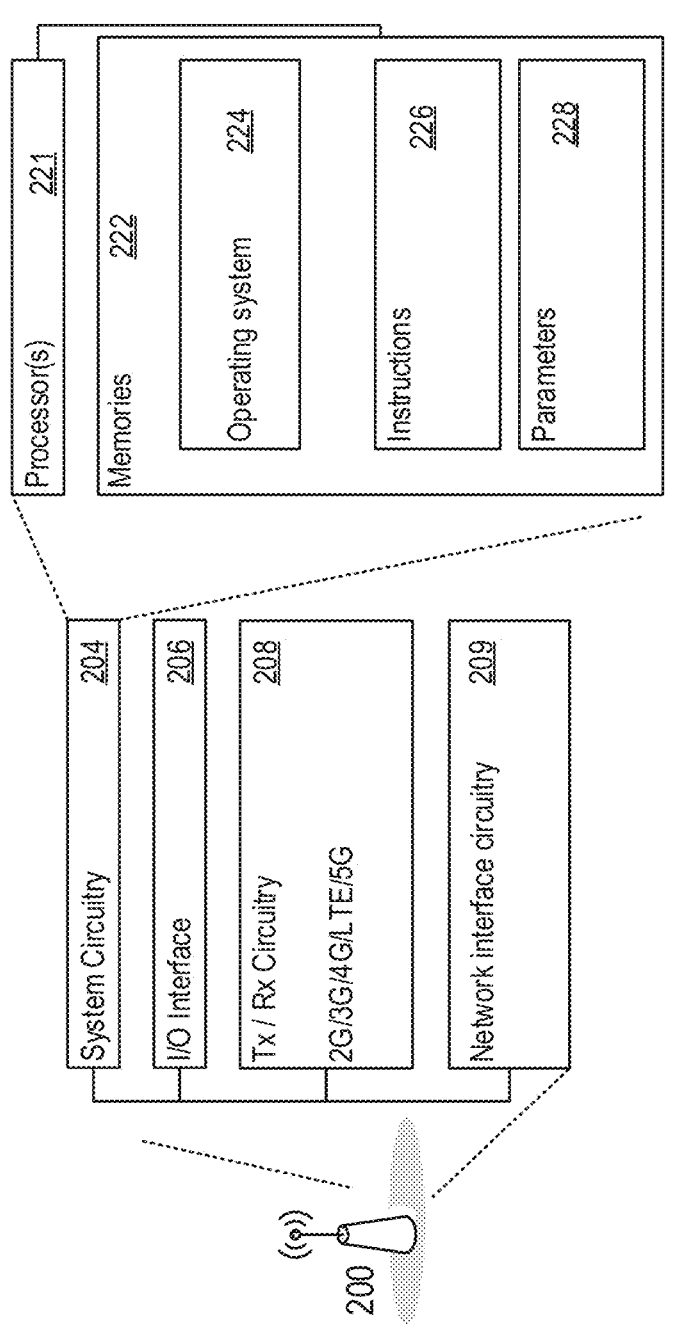
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
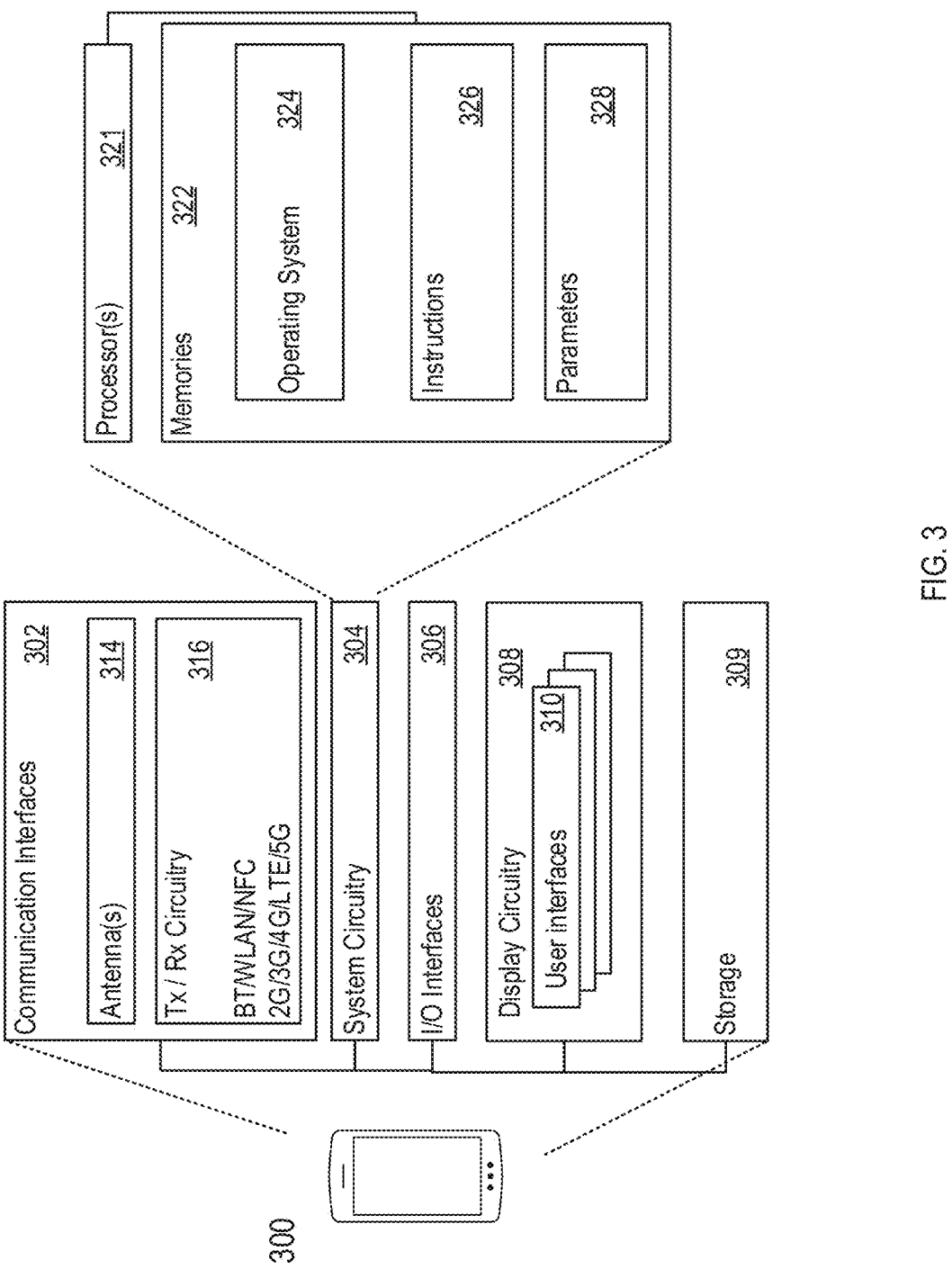
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), 5G standards, and/or 6G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G, 6G, or other data that the UE 300 will send, or has received, through the communication interfaces

7

302. In various implementations, a system power for the UE 300 may be supplied by a power storage device, such as a battery or a transformer.

The present disclosure describes various embodiment for uplink control information (UCI) multiplexing with a physical uplink shared channel (PUSCH), which may be implemented, partly or totally, on the network base station and/or the user equipment described above in FIGS. 2-3. The various embodiments in the present disclosure may enable efficient multiplexing operation of UCIs with a PUSCH, which may increase the resource utilization efficiency, and/or boost latency performance of the wireless data traffic.

Figures 4A, 4B:
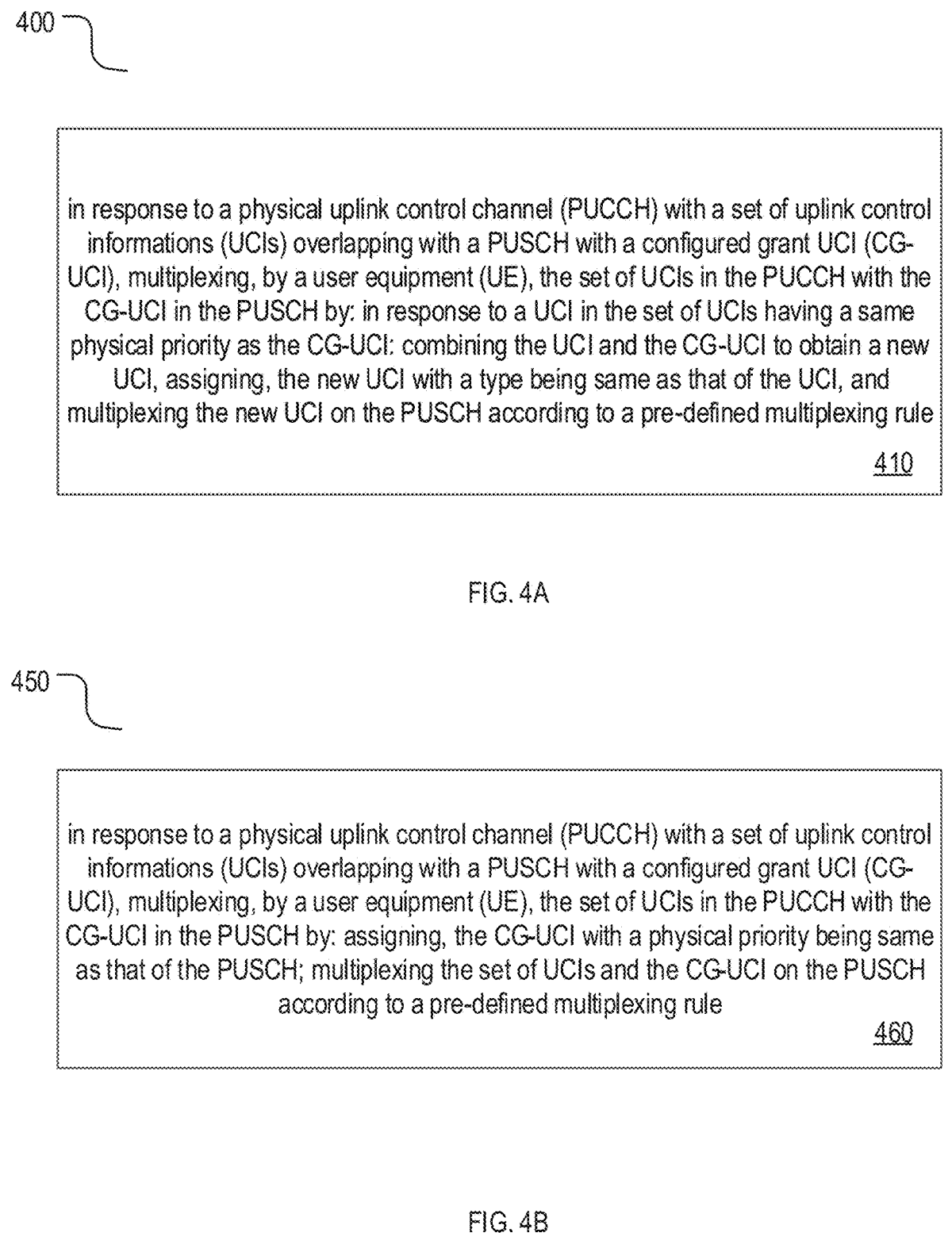

Referring to FIG. 4A, the present disclosure describes various embodiments of a method 400 for wireless communication. The method may include a portion or all of the following steps: step 410, in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by: in response to a UCI in the set of UCIs having a same physical priority as the CG-UCI: combining the UCI and the CG-UCI to obtain a new UCI, assigning, the new UCI with a type being same as that of the UCI, and multiplexing the new UCI on the PUSCH according to a pre-defined multiplexing rule.

In some implementations, each UCI in the set of UCIs comprises one of the following types: hybrid automatic repeat request acknowledgement (HARQ-ACK), channel state information report (CSI) part 1, or CSI part 2.

In some implementations, the CG-UCI comprises at least one of the following: a HARQ ID, a redundancy version (RV) ID, or a channel occupancy time (COT).

In some implementations, in response to the UCI in the set of UCIs having a different physical priority than the CG-UCI: assigning, the CG-UCI with a type being same as that of the UCI, assigning, the CG-UCI with a physical priority being same as that of the PUSCH; and/or multiplexing the UCI and the CG-UCI on the PUSCH according to the pre-defined multiplexing rule.

In some implementations, the UCI and the CG-UCI are combined to obtain the new UCI according to one of a localized concatenation method or a distributed concatenation method.

In some implementations, according to the localized concatenation: the new UCI comprises a first portion and a second portion; the first portion comprises the UCI continuously without interruption; and/or the second portion comprises the CG-UCI continuously without interruption.

In some implementations, according to the distributed concatenation: the new UCI comprises a first portion and a second portion; the first portion comprises M segments, each segment comprising N bits of the UCI and N bits of the CG-UCI alternately until a shorter one between the UCI and the CG-UCI is distributed completely, each of M and N being a positive integer; and/or the second portion comprises a remainder of a longer one between the UCI and the CG-UCI.

In some implementations, the pre-defined multiplexing rule comprises: a threshold number of UCIs that are multiplexed on the PUSCH; in response to a number of UCIs being more than the threshold number, the threshold number of UCIs are selected from the UCIs based on a priority order of UCI types from high to low priority; and/or a coding chain order of multiplexed UCIs follows the priority order of UCI types from high to low priority.

In some implementations, the threshold number is 3; and the priority order of UCI types comprises high priority (HP) HARQ-ACK, HP CSI part 1, HP CSI part 2, low priority (LP) HARQ-ACK, LP CSI part 1, and LP CSI part 2.

In some implementations, in response to a first UCI being a HP HARQ-ACK and the PUSCH with the CG-UCI being a HP PUSCH: the first UCI and the CG-UCI are concatenated to obtain the new UCI; the new UCI is assigned as a HP HARQ-ACK; and/or the new UCI is multiplexed on the PUSCH according to the pre-defined multiplexing rule.

In some implementations, in response to a first UCI being a LP HARQ-ACK and the PUSCH with the CG-UCI being a LP PUSCH: the first UCI and the CG-UCI are concatenated to obtain the new UCI; the new UCI is assigned as a LP HARQ-ACK; and the new UCI is multiplexed on the PUSCH according to the pre-defined multiplexing rule.

In some implementations, in response to a first UCI being a HARQ-ACK and the PUSCH with the CG-UCI being a PUSCH with the same priority, a second UCI being a CSI with any priority: the first UCI and the CG-UCI are concatenated to obtain the new UCI; the new UCI is assigned as HARQ-ACK with same priority of first UCI; and/or the new UCI, second UCI are multiplexed on the PUSCH according to the pre-defined multiplexing rule.

In some implementations, in response to a first UCI being a LP HARQ-ACK and the PUSCH with the CG-UCI being a HP PUSCH: the CG-UCI is assigned as a HP HARQ-ACK; and/or the first UCI and the CG-UCI are multiplexed on the PUSCH according to the pre-defined multiplexing rule.

In some implementations, in response to a first UCI being a HP HARQ-ACK, a second UCI being a LP HARQ-ACK, and the PUSCH with the CG-UCI being a HP PUSCH: the first UCI and the CG-UCI are concatenated to obtain the new UCI; the new UCI is assigned as a HP HARQ-ACK; and/or the new UCI and the second UCI are multiplexed on the PUSCH according to the pre-defined multiplexing rule.

In some implementations, in response to a first UCI being a HP HARQ-ACK and the PUSCH with the CG-UCI being a LP PUSCH: the CG-UCI is assigned as a LP HARQ-ACK; and/or the first UCI and the CG-UCI are multiplexed on the PUSCH according to the pre-defined multiplexing rule.

In some implementations, in response to a first UCI being a HP HARQ-ACK, a second UCI being a LP HARQ-ACK, and the PUSCH with the CG-UCI being a LP PUSCH: the second UCI and the CG-UCI are concatenated to obtain the new UCI; the new UCI is assigned as a LP HARQ-ACK; and/or the new UCI and the first UCI are multiplexed on the PUSCH according to the pre-defined multiplexing rule.

The present disclosure describes various non-limiting exemplary embodiments in the following paragraphs, which may serve as exemplary implementations of a PUCCH with one or more UCI multiplexing with a PUSCH carrying a CG-UCI. Various embodiments describe solutions for the PUCCH with UCI multiplexing with the PUSCH carrying the CG-UCI, for example, the LP HARQ-ACK and/or HP HARQ-ACK multiplex on HP/LP PUSCH with CG-UCI may be defined and solved.

In some implementations, a CG-UCI, being the configured grant UCI, normally includes a HARQ identifier (ID), a redundancy version (RV) ID, a channel occupancy time (COT) or other control information for the PUSCH to be transmitted. A physical priority of the CG-UCI may share the physical priority of the PUSCH which carries the CG-UCI, i.e., the physical priority of the CG-UCI and the physical priority of the PUSCH carrying the CG-UCI may be the same.

In some implementations, when there is no other UCI except CG-UCI being multiplexed into the PUSCH, the CG-UCI may be multiplexed in the PUSCH which the information in CG-UCI is corresponding to this PUSCH. The multiplexing rule may follow a pre-defined multiplexing rule of a HARQ-ACK on the PUSCH. The pre-defined multiplexing rule may be a traditional multiplexing rule or an existing multiplexing rule.

In some implementations, for to-be-identified and to-be-solved cases of a LP HARQ-ACK and/or a HP HARQ-ACK multiplexing on a HP/LP PUSCH with a CG-UCI, whether the UCI of the CSI parts are involved in the multiplexing with PUSCH may not affect the described solutions in various embodiments in the present disclosure.

In some implementations, two kinds of categories may be defined, and the criterion for categories may be based on whether or not there are different priority of HARQ-ACK would multiplex with the PUSCH with the CG-UCI: a first category is that the HARQ-ACK has the same priority with the PUSCH with the CG-UCI; and a second category is the HARQ-ACK has the different priority with the PUSCH with the CG-UCI.

Depending on the physical priorities/types of UCIs and the physical priority of the PUSCH with the CG-UCI, the above categories may be further divided to the following cases, and each case is described in details in following paragraphs. The first category may be further divided to two cases: Case 1, a HP HARQ-ACK multiplexing on a HP PUSCH with a CG-UCI; and Case 2, a LP HARQ-ACK multiplexing on a LP PUSCH with a CG-UCI. The second category may be further divided to four cases: Case 3, a LP HARQ-ACK only multiplexing on a HP PUSCH with a CG-UCI; Case 4, a HP HARQ-ACK and a LP HARQ-ACK multiplexing on a HP PUSCH with a CG-UCI; Case 5, a HP HARQ-ACK only multiplexing on a LP PUSCH with a CG-UCI; Case 6, a HP HARQ-ACK and a LP HARQ-ACK multiplexing on a LP PUSCH with a CG-UCI.

In some implementations, regarding the rule of multiplexing, the CG-UCI may be concatenated before or after the HARQ-ACK UCI with the same priority, and then the resultant concatenated UCIs or the combination of UCIs should be treated as ordinary HARQ-ACK information to be multiplexed on the PUSCH as a predefined multiplexing rule.

Figures 5A, 5B, 5C:
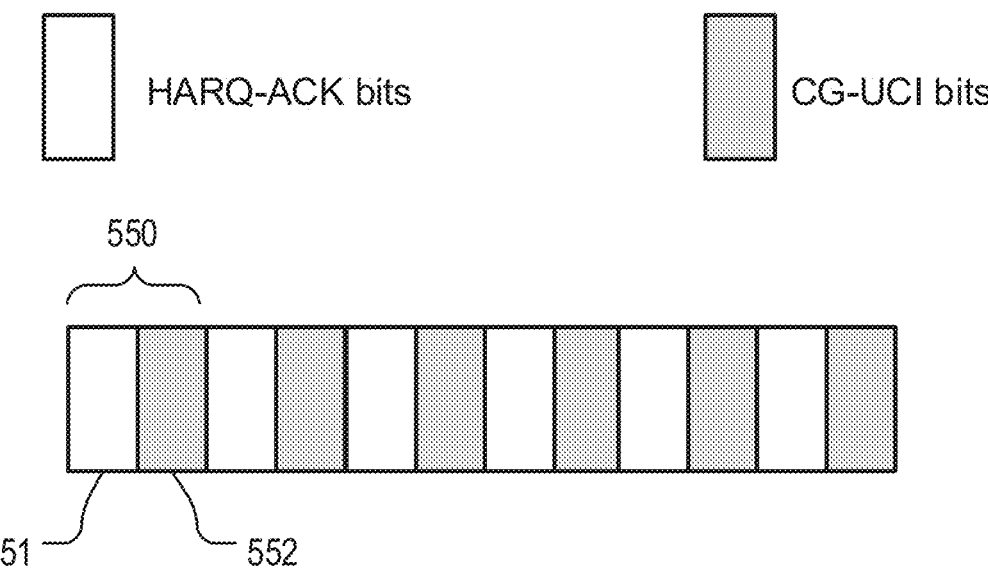
FIG. 5A shows a schematic diagram of a localized concatenation in an exemplary embodiment for wireless communication.
FIG. 5B shows another schematic diagram of the localized concatenation in an exemplary embodiment for wireless communication.
FIG. 5C shows a schematic diagram of a distributed concatenation in an exemplary embodiment for wireless communication.

Referring to FIGS. 5A and 5B, in some implementations, the concatenation between the CG-UCI and the HARQ-ACK UCI may be concatenating the two parts of control information from CG-UCI and HARQ-ACK end to end, which may be called as localized mapping. The part of control information from HARQ-ACK may be disposed in front of (or "earlier" in time) the CG-UCI, as shown in FIG. 5A. Alternatively, the part of control information from HARQ-ACK may be disposed after (or "later" in time) the CG-UCI, as shown in FIG. 5B.

Figure 5D:
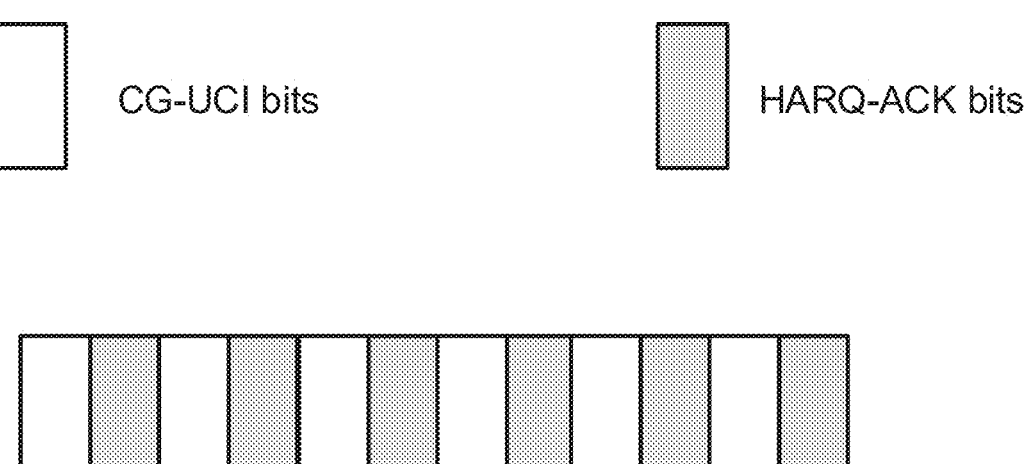
FIG. 5D shows another schematic diagram of the distributed concatenation in an exemplary embodiment for wireless communication.
Figure 5E:
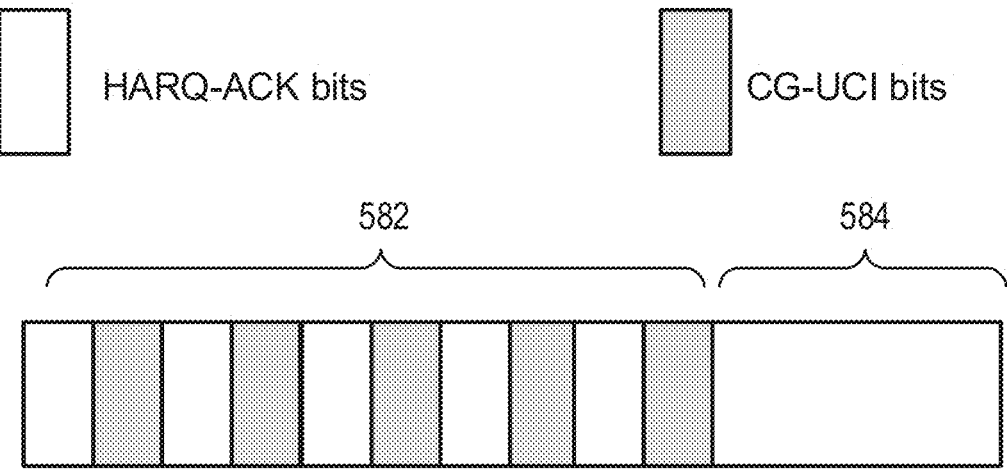
FIG. 5E shows another schematic diagram of the distributed concatenation in an exemplary embodiment for wireless communication.

Referring to FIGS. 5C, 5D, and 5E, the concatenation between the CG-UCI and the HARQ-ACK UCI may be concatenating by a distributed mapping between the two parts of control information like a comb shape. As shown in FIG. 5C, the concatenated resultant UCI may include M segments. Each segment 550 includes N bits of UCI 551 (HARQ-ACK in this example) and N bits of CG-UCI bits 552. M is a positive integer, for example but not limited to, 5, 10, 20, 50, or 120. N is a positive integer, for example but not limited to 1, 2, 3, 4, 5, 8, or 10. In some implementation, referring to FIG. 5D, in the distributed mapping, each segment may include N bits of CG-UCI followed by N bits of HARQ-ACK. In some implementations, FIG. 5E shows an exemplary example when a length/size of the HARQ-ACK bits is larger than the CG-UCI bits. The concatenated resultant UCI may include two portions: a first portion 582 includes, as the comb shape, M segments and each segment includes N bits of HARQ-ACK followed by N bits of CG-UCI bits 552; and a second portion 584 includes a reminder of the HARQ-ACK bits since the HARQ-ACK is longer/larger than the CG-UCI. Similarly in some implementations, when the CG-UCI is longer than the HARQ-ACK, the second portion may include a reminder of the CG-UCI.

Regarding Case 1, a HP HARQ-ACK may multiplex on a HP PUSCH with a CG-UCI. The CG-UCI shares the same high priority with the PUSCH, and it is concatenated before or after the HP HARQ-ACK (either in a localized concatenation manner or in a distributed concatenation manner). Referring to FIG. 6A, the resultant HP PUCCH with the HP HARQ-ACK and the CG UCI after concatenation (610) may be treated as the HP HARQ-ACK. The pre-defined multiplexing rule may be performed, e.g., the pre-defined (or legacy) multiplexing rule for the HP HARQ-ACK multiplexing on the HP PUSCH without the CG-UCI, wherein coding chains may be provided one by one to contain UCIs based on the descending order of priorities of UCIs, and/or the UCI priority descending order may include: a HP HARQ-ACK, a HP CSI part 1, a HP CSI part 2, a LP HARQ-ACK, a LP CSI part 1, and a LP CSI part 2.

Regarding Case 2, a LP HARQ-ACK may multiplex on a LP PUSCH with a CG-UCI. The CG-UCI may share the same low priority with the PUSCH, and it is concatenated before or after LP HARQ-ACK (either in a localized concatenation manner or in a distributed concatenation manner). Referring to FIG. 6B, the resultant after concatenation of LP HARQ-ACK and CG UCI (620) may be treated as LP HARQ-ACK. The pre-defined multiplexing rule may be performed, e.g., the pre-defined (or legacy) multiplexing rule for the LP HARQ-ACK multiplexing on the LP PUSCH without the CG-UCI, wherein coding chains may be provided one by one to contain UCIs based on the descending order of priorities of UCIs, and/or the UCI priority descending order may include: a HP HARQ-ACK, a HP CSI part 1, a HP CSI part 2, a LP HARQ-ACK, a LP CSI part 1, and a LP CSI part 2.

Regarding Case 3, a LP HARQ-ACK may multiplex on a HP PUSCH with a CG-UCI. The CG-UCI may share the same high priority with PUSCH, and it can't concatenated with LP HARQ-ACK. Referring to FIG. 6C, the CG-UCI is treated as HP HARQ-ACK (630), the overall multiplexing solution will follow the pre-defined multiplexing rule, e.g., the pre-defined (or legacy) multiplexing rule for the HP HARQ-ACK and the LP HARQ-ACK on the HP PUSCH without the CG-UCI, wherein coding chains may be provided one by one to contain UCIs based on the descending order of priorities of UCIs, and/or the UCI priority descending order may include: a HP HARQ-ACK, a HP CSI part 1, a HP CSI part 2, a LP HARQ-ACK, a LP CSI part 1, and a LP CSI part 2.

Figure 6D:
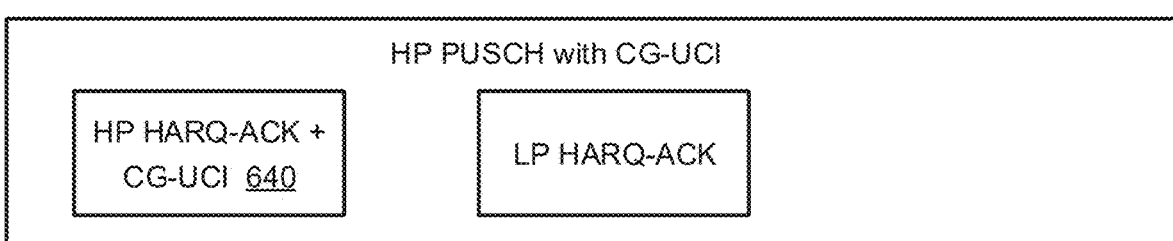
FIG. 6D shows a schematic diagram of an exemplary embodiment for wireless communication.

Regarding Case 4, a HP HARQ-ACK and a LP HARQ-ACK may multiplex on a HP PUSCH with a CG-UCI. The CG-UCI may share the same high priority with PUSCH, and it is concatenated before or after the HP HARQ-ACK (either in a localized concatenation manner or in a distributed concatenation manner). Referring to FIG. 6D, the resultant HP PUCCH with HP HARQ-ACK and CG UCI after concatenation (640) may be treated as a HP HARQ-ACK. The pre-defined multiplexing rule may be performed, e.g., the pre-defined (or legacy) multiplexing rule for the HP HARQ-ACK and the LP HARQ-ACK multiplexing on the HP PUSCH without the CG-UCI, wherein coding chains may be provided one by one to contain UCIs on the descending order of priorities of UCIs, and/or the UCI priority descending order may include: a HP HARQ-ACK, a HP CSI part 1, a HP CSI part 2, a LP HARQ-ACK, a LP CSI part 1, and a LP CSI part 2.

Figure 6E:
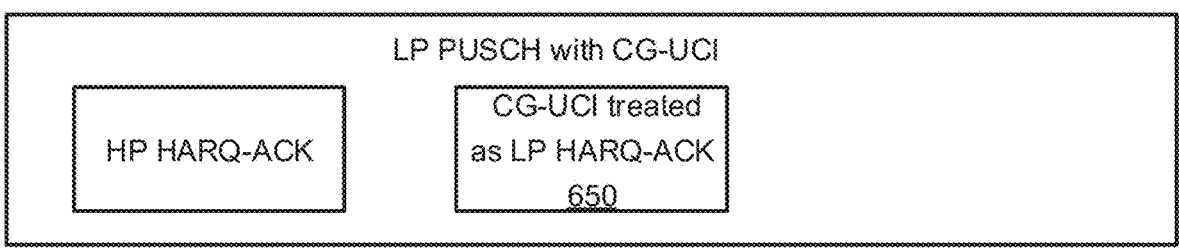
FIG. 6E shows a schematic diagram of another exemplary embodiment for wireless communication.

Regarding Case 5, a HP HARQ-ACK may multiplex on a LP PUSCH with a CG-UCI. The CG-UCI may share the same low priority with PUSCH, and it can't concatenated with HP HARQ-ACK. Referring to FIG. 6E, the CG-UCI is treated as the LP HARQ-ACK (650), the overall multiplexing solution may follow the pre-defined multiplexing rule, e.g., the pre-defined (or legacy) multiplexing rule for the HP HARQ-ACK and the LP HARQ-ACK on the LP PUSCH without the CG-UCI, wherein coding chains may be provided one by one to contain UCIs based on the descending order of priorities of UCIs, and/or the UCI priority descending order may include: a HP HARQ-ACK, a HP CSI part 1, a HP CSI part 2, a LP HARQ-ACK, a LP CSI part 1, and a LP CSI part 2.

Figure 6F:
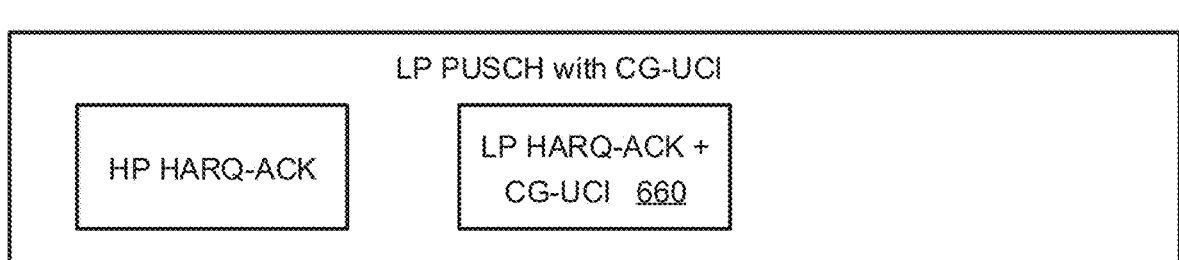
FIG. 6F shows a schematic diagram of another exemplary embodiment for wireless communication.

Regarding Case 6, a HP HARQ-ACK and a LP HARQ-ACK may multiplex on a LP PUSCH with a CG-UCI. The CG-UCI may share the same low priority with the PUSCH, and it is concatenated before or after LP HARQ-ACK (either in a localized concatenation manner or in a distributed concatenation manner). Referring to FIG. 6F, the resultant after concatenation of LP HARQ-ACK and CG UCI (660) may be treated as LP HARQ-ACK. The pre-defined multiplexing rule may be performed, e.g., the pre-defined (or legacy) multiplexing rule for the HP HARQ-ACK and the LP HARQ-ACK multiplexing on the LP PUSCH without the CG-UCI, wherein coding chains may be provided one by one to contain UCIs based on the descending order of priorities of UCIs, and/or the UCI priority descending order may include: a HP HARQ-ACK, a HP CSI part 1, a HP CSI part 2, a LP HARQ-ACK, a LP CSI part 1, and a LP CSI part 2.

For the above four cases, they may all use the legacy rule for the HP HARQ-ACK and the LP HARQ-ACK multiplexing on the HP or the LP PUSCH without the CG-UCI. As a non-limiting example of the typical legacy rule, for multiplexing a HP HARQ-ACK and a LP HARQ-ACK into a PUSCH, when a HP HARQ-ACK and a LP HARQ-ACK would be transmitted on a HP/LP PUSCH without a CSI, the HP HARQ-ACK and the LP HARQ-ACK may be separately encoded according to the legacy coding rule by the UE. The UE may re-use a legacy HARQ-ACK rate matching or puncturing and a RE mapping for the HP HARQ-ACK. For a LP HARQ-ACK, the UE may re-use legacy rule for a CSI part 1 rate matching and RE mapping.

Referring to FIG. 4A, the present disclosure describes various embodiments of a method 450 for wireless communication. The method may include a portion or all of the following steps: step 460, in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by: assigning, the CG-UCI with a physical priority being same as that of the PUSCH; multiplexing the set of UCIs and the CG-UCI on the PUSCH according to a pre-defined multiplexing rule.

In some implementations, the pre-defined multiplexing rule comprises: a threshold number of UCIs that are multiplexed on the PUSCH; in response to a number of UCIs being more than the threshold number, the threshold number of UCIs are selected from the UCIs based on a priority order of UCI types from high to low priority; and/or a coding chain order of multiplexed UCIs follows the priority order of UCI types from high to low priority.

In some implementations, the threshold number is 3; and/or the priority order of UCI types comprises high priority (HP) HARQ-ACK, HP CG-UCI, HP CSI part 1, HP CSI part 2, low priority (LP) HARQ-ACK, LP CG-UCI, LP CSI part 1, and LP CSI part 2.

In some implementations, in response to a first UCI being a HP HARQ-ACK, a second UCI being a LP HARQ-ACK, and the PUSCH with the CG-UCI being a HP PUSCH: the CG-UCI is assigned as a HP CG-UCI; and/or according to the pre-defined multiplexing rule, the coding chain order is the HP HARQ-ACK, the HP CG-UCI, and the LP HARQ-ACK.

In some implementations, in response to a first UCI being a HP HARQ-ACK, a second UCI being a LP HARQ-ACK, a third UCI being a HP CSI part 1, and the PUSCH with the CG-UCI being a HP PUSCH: the CG-UCI is assigned as a HP CG-UCI; and/or according to the pre-defined multiplexing rule, the LP HARQ-ACK is dropped and the coding chain order is the HP HARQ-ACK, the HP CG-UCI, and the HP CSI part 1.

In some implementations, in response to a first UCI being a HP HARQ-ACK, a second UCI being a LP HARQ-ACK, a third UCI being a LP CSI part 1, and the PUSCH with the CG-UCI being a LP PUSCH: the CG-UCI is assigned as a LP CG-UCI; and/or according to the pre-defined multiplexing rule, the LP CSI part 1 is dropped and the coding chain order is the HP HARQ-ACK, the LP HARQ-ACK, and the LP CG-UCI.

The present disclosure describes various non-limiting exemplary embodiments in the following paragraphs, which may serve as exemplary implementations of a PUCCH with one or more UCI multiplexing with a PUSCH carrying a CG-UCI. Various embodiments describe solutions for the PUCCH with UCI multiplexing with the PUSCH carrying the CG-UCI, wherein the CG-UCI and HARQ-ACK may be treated as individual UCI and may be separately coded by different coding chain when UCIs multiplex with PUSCH. The CG-UCI follows the physical priority of the corresponding PUSCH, and the all coding chains priority order follows the descending order of HP HARQ-ACK, HP CG-UCI, HP CSI-part 1, HP CSI-part 2, LP HARQ-ACK, LP CG-UCI, LP CSI part 1 and LP CSI part 2. The rate matching and RE mapping may follow the same order or principle.

Figure 7A:
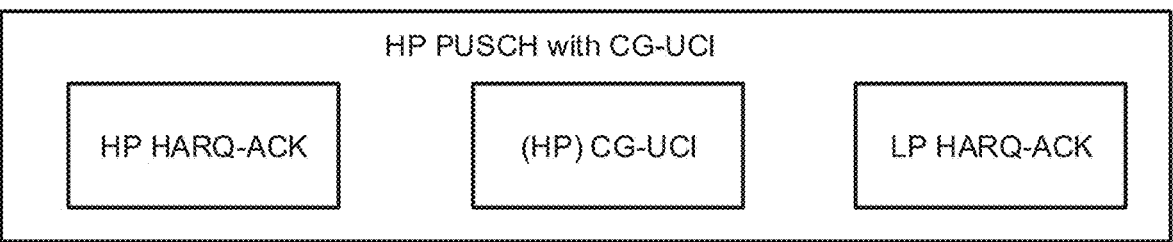
FIG. 7A shows a schematic diagram of an exemplary embodiment for wireless communication.

For a non-limiting exemplary example as shown in FIG. 7A, when there are a HP HARQ, a LP HARQ and a HP PUSCH multiplexing with a HP PUSCH with a CG-UCI, the coding chain order may be the HP HARQ, the CG-UCI (being effectively as HP CG-UCI because of the HP PUSCH), and the LP HARQ. The rate matching and RE mapping for each part of UCIs may be processed accordingly.

Figure 7B:
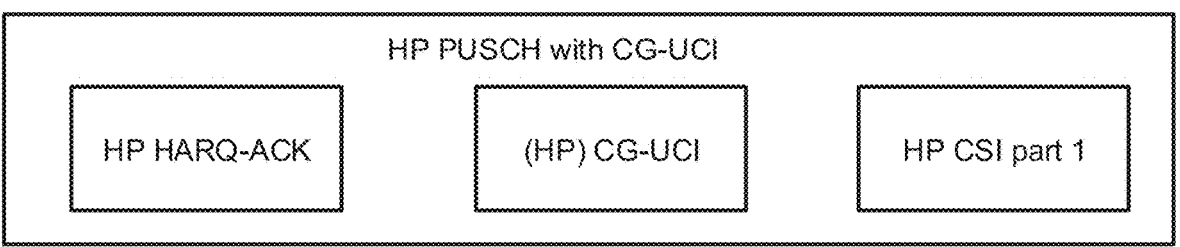
FIG. 7B shows a schematic diagram of another exemplary embodiment for wireless communication.

For another non-limiting exemplary example as shown in FIG. 7B, when there are a HP HARQ, a LP HARQ, a HP CSI-part 1 and a HP PUSCH multiplexing with a HP PUSCH with a CG-UCI, the coding chain order may be the HP HARQ, the CG-UCI (being effectively as HP CG-UCI because of the HP PUSCH), and the HP CSI-part 1. The LP HARQ may be dropped as the total number of coding chains limitation being three. The rate matching and RE mapping for each part of UCIs may be processed accordingly.

Figure 7C:
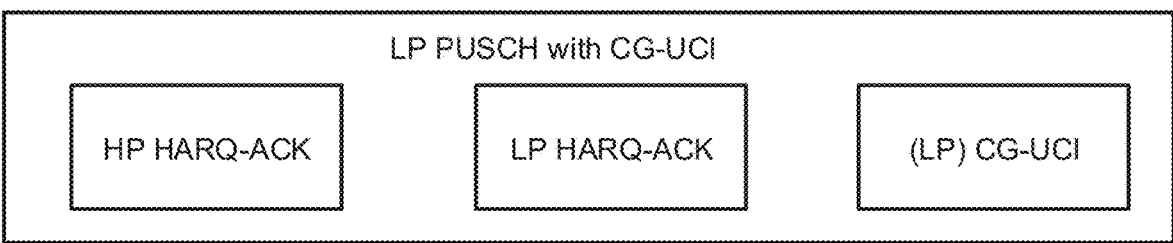
FIG. 7C shows a schematic diagram of another exemplary embodiment for wireless communication.

For another non-limiting exemplary example as shown in FIG. 7C, when there are a HP HARQ, a LP HARQ, a LP CSI-part 1, and a LP PUSCH multiplexing with a LP PUSCH with a CG-UCI, the coding chain order is the HP HARQ, the LP HARQ, and the CG-UCI (being effectively as LP CG-UCI because of the LP PUSCH). LP CSI-part 1 may be dropped due to the capacity limitation of coding chains. The rate matching and RE mapping for each part of UCIs may be processed accordingly.

The present disclosure describes various embodiments for solutions under the circumstances when there is insufficient resource for one or more UCI to multiplex with a PUSCH.

When the UCIs are multiplexed in PUSCH, some REs may be semi-statically or dynamically allocated to the at most three parts of UCI to be multiplexed with PUSCH, the calculation of number of used REs for UCIs may be based on the $\beta_{offset}$ and $\alpha$ which are semi-static configured or dynamic indicated by gNB.

Although the coding chains are enough to support at most 3 kinds of UCIs to be carried by PUSCH, it is possible that gNB may not allocate sufficient resource element (RE) to accommodate some of the UCIs, especially for the low priority UCI in the overall coding chains, e.g., a LP HARQ-ACK. For example, there may be three UCIs including a HP HARQ-ACK, a HP CSI part 1 and a LP HARQ-ACK to be multiplexed with a PUSCH, but there is no enough REs to carry the LP HARQ-ACK.

In some implementations, a simple way may be to drop the entire LP HARQ-ACK, although it causes the unnecessary loss of the LP HARQ-ACK. When the LP HARQ-ACK is entirely dropped, the UE may determine whether the leftover REs for LP HARQ-ACK may be reallocated to the HP UCI or PUSCH. To improve the spectrum efficiency, the UE may reallocate the leftover REs for the dropped LP HARQ-ACK to the HP UCI or the HP PUSCH, which may need the UE to come back to the RE occupation calculation again, and which is not preferred by the UE.

The UE may implement one of the two possible alternatives to reuse the leftover REs for dropped UCI, e.g., the LP HARQ-ACK.

Figures 8A, 8B:
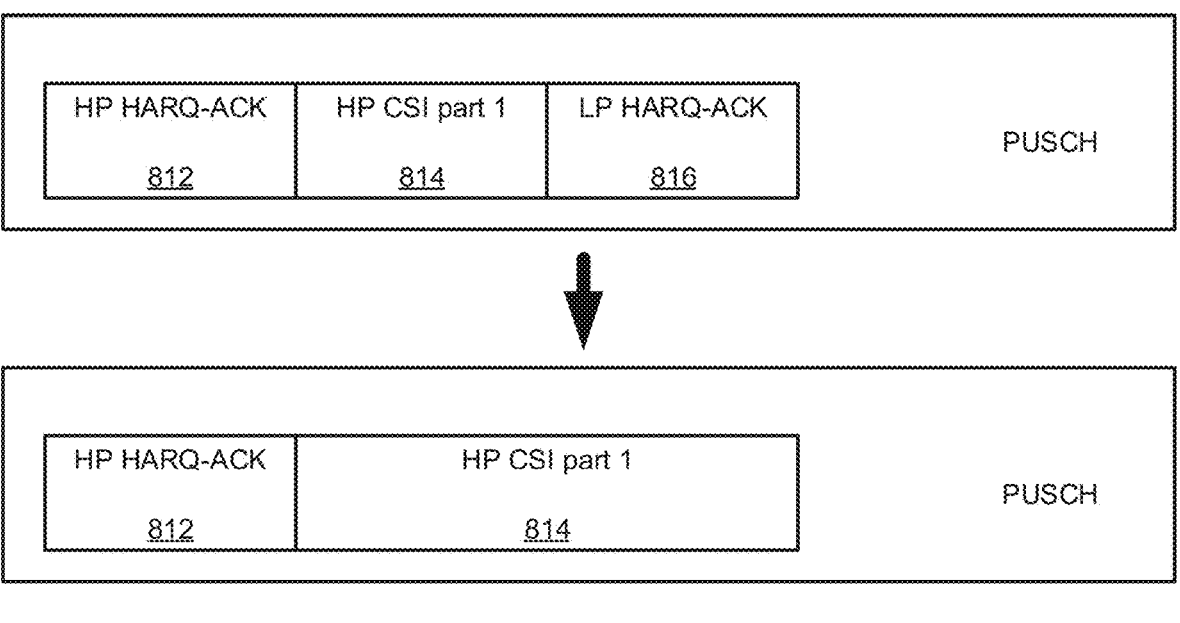
FIG. 8A shows a schematic diagram of an exemplary embodiment for wireless communication.
FIG. 8B shows a schematic diagram of another exemplary embodiment for wireless communication.

As a first alternative, the available REs for HP UCI may be expanded to reuse the leftover REs by rate matching or reducing the coding rate, and thus no need to come back to the RE calculation procedure. For a non-limiting example as shown in FIG. 8A, there are three UCIs including a HP HARQ-ACK 812, a HP CSI part 1 814, and a LP HARQ-ACK 816 to be multiplexed with a PUSCH, but there is no enough REs to carry the LP HARQ-ACK. The LP HARQ-ACK is dropped, and the available REs for the HP CSI part 1 are expanded to reuse the leftover REs by rate matching or reducing the coding rate. For another non-limiting example as shown in FIG. 8B, when the LP HARQ-ACK is dropped, the available REs for the HP HARQ-ACK are expanded to reuse the leftover REs by rate matching or reducing the coding rate.

Referring back to FIG. 8A, in some implementations, when the UE does RE mapping for the coded modulation symbols of the HP CSI part 1, it may determine whether or not the calculated coding rate of the LP HARQ-ACK exceeds the maximum configured or indicated coding rate after the calculation of RE number for the LP HARQ-ACK. When the determination gives a positive answer (i.e., "yes"), the UE performs RE mapping for the coded modulation symbols of the HP CSI from the symbol 0 of PUSCH (first symbol of PUSCH after the symbols allocated for the HP HARQ-ACK), frequency first and time domain second, symbol by symbol, to the last RE of LP HARQ-ACK, except the REs allocated for the HP HARQ-ACK. When the determination gives a negative answer (i.e., "no"), the UE performs RE mapping for the coded modulation symbols of the HP CSI part 1 from the symbol 0 of PUSCH (first symbol of PUSCH after the symbols allocated for the HP HARQ-ACK), frequency first and time domain second, symbol by symbol, to the last RE for HP CSI, except the REs for HP HARQ-ACK.

Figure 8C:
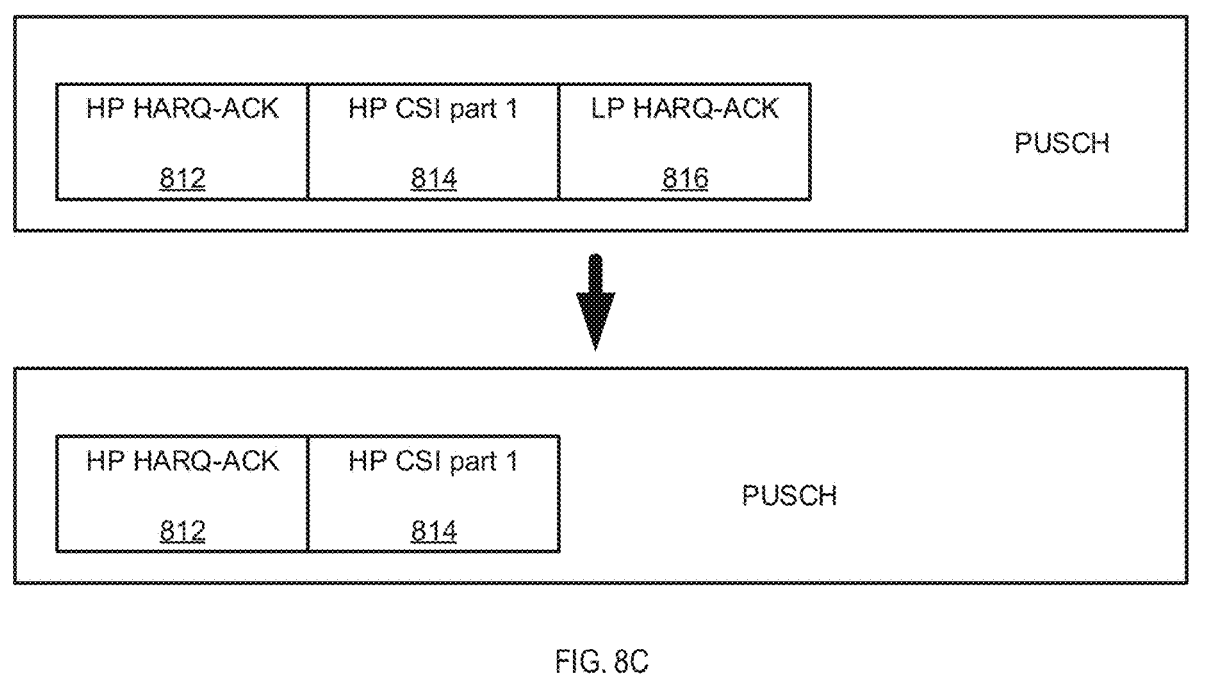

As a second alternative, referring to FIG. 8C, the leftover REs may be recycled or absorbed to be used for the data payload of PUSCH. As the REs for PUSCH is determined after all the UCI REs determination, it may be relatively easy to recycle or absorb the unused REs for the UCI in the previous procedure. In some implementations, when the UE performs RE mapping for the coded modulation symbols of the UL-SCH, which is the uplink scheduled channel carrying the payload of data, it may determine whether or not the calculated coding rate of the LP HARQ-ACK exceeds the maximum configured or indicated coding rate after the calculation of RE number for the LP HARQ-ACK. When the determination gives a positive answer (i.e., "yes"), the UE may use the REs for the LP HARQ-ACK to do the RE mapping for the coded modulation symbols of the UL-SCH. When the determination gives a negative answer (i.e., "no"), the RE mapping for the coded modulation symbols of the UL-SCH may skip the REs for the LP HARQ-ACK.

The above examples illustrated by FIGS. 8A, 8B, and 8C are not limited to the cases of having three UCIs to be carried by the PUSCH. When less than three UCIs (e.g., only 2 UCIs) are to be carried by the PUSCH, it is possible that the UCI with a lower priority among the two UCIs may be dropped due to the insufficient resources with the same reason as above mentioned. The above examples illustrated by FIGS. 8A, 8B, and 8C are not limited, in term of type of channels, to a HP HARQ-ACK, a HP CSI part 1 and a LP HARQ-ACK, and some implementations may include any types of the UCIs, including a HP HARQ-ACK, a HP CG-UCI, a HP CSI-part 1, a HP CSI-part 2, a LP HARQ-ACK, a LP CG-UCI, a LP CSI part 1, a LP CSI part 2, and any other possible type of UCIs.

The present disclosure describes methods, apparatus, and computer-readable medium for wireless communication. The present disclosure addressed the issues with configuring uplink control information (UCI) multiplexing with a physical uplink shared channel (PUSCH). The methods, devices, and computer-readable medium described in the present disclosure may facilitate the performance of wireless communication by configuring UCI multiplexing with a PUSCH, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:

in response to a physical uplink control channel (PUCCH) with a set of uplink control informations (UCIs) overlapping with a PUSCH with a configured grant UCI (CG-UCI), multiplexing, by a user equipment (UE), the set of UCIs in the PUCCH with the CG-UCI in the PUSCH by:

in response to a UCI in the set of UCIs having a same physical priority as the CG-UCI:

combining the UCI and the CG-UCI to obtain a new UCI, assigning, the new UCI with a type being same as that of the UCI, and multiplexing the new UCI on the PUSCH according to a pre-defined multiplexing rule, wherein:

the UCI and the CG-UCI are combined to obtain the new UCI according to a distributed concatenation method, wherein:

the new UCI comprises a first portion and a second portion, the first portion comprises M segments, each segment comprising N bits of the UCI and N bits of the CG-UCI alternately until a shorter one between the UCI and the CG-UCI is distributed completely, each of M and N being a positive integer, and the second portion comprises a remainder of a longer one between the UCI and the CG-UCI.

2. The method according to claim 1, further comprising:

in response to the UCI in the set of UCIs having a different physical priority than the CG-UCI:

assigning, the CG-UCI with a type being same as that of the UCI, assigning, the CG-UCI with a physical priority being same as that of the PUSCH; and multiplexing the UCI and the CG-UCI on the PUSCH according to the pre-defined multiplexing rule.

3. The method according to claim 1, wherein:

in response to a first UCI being a HP HARQ-ACK and the PUSCH with the CG-UCI being a HP PUSCH:

the first UCI and the CG-UCI are concatenated to obtain the new UCI;

the new UCI is assigned as a HP HARQ-ACK; and the new UCI is multiplexed on the PUSCH according to the pre-defined multiplexing rule.

4. The method according to claim 1, wherein:

in response to a first UCI being a low priority (LP) HARQ-ACK and the PUSCH with the CG-UCI being a LP PUSCH:

the first UCI and the CG-UCI are concatenated to obtain the new UCI;

the new UCI is assigned as a LP HARQ-ACK; and the new UCI is multiplexed on the PUSCH according to the pre-defined multiplexing rule.

5. The method according to claim 1, wherein:

in response to a first UCI being a HARQ-ACK and the PUSCH with the CG-UCI being a PUSCH with the same priority, a second UCI being a CSI with any priority:

the first UCI and the CG-UCI are concatenated to obtain the new UCI;

the new UCI is assigned as HARQ-ACK with same priority of first UCI; and the new UCI, second UCI are multiplexed on the PUSCH according to the pre-defined multiplexing rule.

6. The method according to claim 1, wherein:

in response to a first UCI being a LP HARQ-ACK and the PUSCH with the CG-UCI being a high priority (HP) PUSCH:

the CG-UCI is assigned as a HP HARQ-ACK; and the first UCI and the CG-UCI are multiplexed on the PUSCH according to the pre-defined multiplexing rule.

7. The method according to claim 1, wherein:

in response to a first UCI being a HP HARQ-ACK, a second UCI being a LP HARQ-ACK, and the PUSCH with the CG-UCI being a HP PUSCH:

the first UCI and the CG-UCI are concatenated to obtain the new UCI;

the new UCI is assigned as a HP HARQ-ACK; and the new UCI and the second UCI are multiplexed on the PUSCH according to the pre-defined multiplexing rule.

8. The method according to claim 1, wherein:

in response to a first UCI being a HP HARQ-ACK and the PUSCH with the CG-UCI being a LP PUSCH:

the CG-UCI is assigned as a LP HARQ-ACK; and the first UCI and the CG-UCI are multiplexed on the PUSCH according to the pre-defined multiplexing rule.

9. The method according to claim 1, wherein:

in response to a first UCI being a HP HARQ-ACK, a second UCI being a LP HARQ-ACK, and the PUSCH with the CG-UCI being a LP PUSCH:

the second UCI and the CG-UCI are concatenated to obtain the new UCI;

the new UCI is assigned as a LP HARQ-ACK; and the new UCI and the first UCI are multiplexed on the PUSCH according to the pre-defined multiplexing rule.

10. An apparatus comprising:

a memory storing instructions; and a processor in communication with the memory, wherein, when the processor executes the instructions, the processor is configured to cause the apparatus to perform, in response to a physical uplink control channel (PUCCH) with a set of uplink control informations (UCIs) overlapping with a PUSCH with a configured grant UCI (CG-UCI), multiplexing the set of UCIs in the PUCCH with the CG-UCI in the PUSCH by:

in response to a UCI in the set of UCIs having a same physical priority as the CG-UCI:

combining the UCI and the CG-UCI to obtain a new UCI, assigning, the new UCI with a type being same as that of the UCI, and multiplexing the new UCI on the PUSCH according to a pre-defined multiplexing rule, wherein:

the UCI and the CG-UCI are combined to obtain the new UCI according to a distributed concatenation method, wherein:

the new UCI comprises a first portion and a second portion, the first portion comprises M segments, each segment comprising N bits of the UCI and N bits of the CG-UCI alternately until a shorter one between the UCI and the CG-UCI is distributed completely, each of M and N being a positive integer, and the second portion comprises a remainder of a longer one between the UCI and the CG-UCI.

11. The apparatus according to claim 10, wherein, when the processor executes the instructions, the processor is configured to further cause the apparatus to perform:

in response to the UCI in the set of UCIs having a different physical priority than the CG-UCI:

assigning, the CG-UCI with a type being same as that of the UCI, assigning, the CG-UCI with a physical priority being same as that of the PUSCH; and multiplexing the UCI and the CG-UCI on the PUSCH according to the pre-defined multiplexing rule.

12. The apparatus according to claim 10, wherein:

in response to a first UCI being a HP HARQ-ACK and the PUSCH with the CG-UCI being a HP PUSCH:

the first UCI and the CG-UCI are concatenated to obtain the new UCI;

the new UCI is assigned as a HP HARQ-ACK; and the new UCI is multiplexed on the PUSCH according to the pre-defined multiplexing rule.

13. The apparatus according to claim 10, wherein:

in response to a first UCI being a LP HARQ-ACK and the PUSCH with the CG-UCI being a LP PUSCH:

the first UCI and the CG-UCI are concatenated to obtain the new UCI;

the new UCI is assigned as a LP HARQ-ACK; and the new UCI is multiplexed on the PUSCH according to the pre-defined multiplexing rule.

14. The apparatus according to claim 10, wherein:

in response to a first UCI being a LP HARQ-ACK and the PUSCH with the CG-UCI being a HP PUSCH:

the CG-UCI is assigned as a HP HARQ-ACK; and the first UCI and the CG-UCI are multiplexed on the PUSCH according to the pre-defined multiplexing rule.

15. A non-transitory computer program product comprising a computer-readable program medium storing instructions, wherein, the instructions, when executed by a processor, are configured to cause the processor to perform:

in response to a physical uplink control channel (PUCCH) with a set of uplink control informations (UCIs) overlapping with a PUSCH with a configured grant UCI (CG-UCI), multiplexing the set of UCIs in the PUCCH with the CG-UCI in the PUSCH by:

in response to a UCI in the set of UCIs having a same physical priority as the CG-UCI:

combining the UCI and the CG-UCI to obtain a new UCI, assigning, the new UCI with a type being same as that of the UCI, and multiplexing the new UCI on the PUSCH according to a pre-defined multiplexing rule, wherein:

the UCI and the CG-UCI are combined to obtain the new UCI according to a distributed concatenation method, wherein:

the new UCI comprises a first portion and a second portion, the first portion comprises M segments, each segment comprising N bits of the UCI and N bits of the CG-UCI alternately until a shorter one between the UCI and the CG-UCI is distributed completely, each of M and N being a positive integer, and the second portion comprises a remainder of a longer one between the UCI and the CG-UCI.

16. The non-transitory computer program product according to claim 15, wherein the instructions, when executed by the processor, are configured to further cause the processor to perform:

in response to the UCI in the set of UCIs having a different physical priority than the CG-UCI:

assigning, the CG-UCI with a type being same as that of the UCI, assigning, the CG-UCI with a physical priority being same as that of the PUSCH; and multiplexing the UCI and the CG-UCI on the PUSCH according to the pre-defined multiplexing rule.

* * * * *